United States Patent
Bregman et al.

(10) Patent No.: US 12,026,545 B2
(45) Date of Patent: Jul. 2, 2024

(54) ACTIVE BUILD MIGRATION IN CONTINUOUS INTEGRATION ENVIRONMENTS

(71) Applicant: Red Hat, Inc., Raleigh, NC (US)

(72) Inventors: Arie Bregman, Gan Yavne (IL); Ilan Gersht, Bat Yam (IL)

(73) Assignee: Red Hat, Inc., Raleigh, NC (US)

( * ) Notice: Subject to any disclaimer, the term of this patent is extended or adjusted under 35 U.S.C. 154(b) by 116 days.

(21) Appl. No.: 17/160,919

(22) Filed: Jan. 28, 2021

(65) Prior Publication Data
US 2022/0237025 A1 Jul. 28, 2022

(51) Int. Cl.
| | |
|---|---|
| *G06F 9/48* | (2006.01) |
| *G06F 9/50* | (2006.01) |
| *G06F 8/41* | (2018.01) |
| *G06F 8/60* | (2018.01) |
| *G06F 11/36* | (2006.01) |

(52) U.S. Cl.
CPC .............. *G06F 9/4881* (2013.01); *G06F 9/48* (2013.01); *G06F 9/4806* (2013.01); *G06F 9/4843* (2013.01); *G06F 9/485* (2013.01); *G06F 9/4856* (2013.01); *G06F 9/4862* (2013.01); *G06F 9/50* (2013.01); *G06F 9/5005* (2013.01); *G06F 9/5011* (2013.01); *G06F 9/5016* (2013.01); *G06F 9/5027* (2013.01); *G06F 9/5044* (2013.01); *G06F 9/505* (2013.01); *G06F 9/5083* (2013.01); *G06F 9/5088* (2013.01); *G06F 8/41* (2013.01); *G06F 8/60* (2013.01); *G06F 11/3688* (2013.01); *G06F 2209/501* (2013.01)

(58) Field of Classification Search
CPC ........ G06F 9/48; G06F 9/4806; G06F 9/4843; G06F 9/485; G06F 9/4856; G06F 9/4862; G06F 9/4881; G06F 9/50; G06F 9/5005; G06F 9/0511; G06F 9/5016; G06F 9/5027; G06F 9/5044; G06F 9/505; G06F 9/5083; G06F 9/5088; G06F 2209/501
See application file for complete search history.

(56) References Cited

U.S. PATENT DOCUMENTS

| | | |
|---|---|---|
| 10,275,231 B1 | 4/2019 | Atkinson et al. |
| 10,776,164 B2 | 9/2020 | Zhao et al. |

(Continued)

OTHER PUBLICATIONS

Petcu "Consuming Resources and Services from Multiple Clouds", West University of Timis, oara and Institute e-Austria, Romani, Dec. 15, 2012, 25 pages https://link.springer.com/article/10.1007/s10723-013-9290-3.

(Continued)

*Primary Examiner* — Charles M Swift
(74) *Attorney, Agent, or Firm* — Dority & Manning, P.A.

(57) ABSTRACT

The technology disclosed herein enables migrating a software build job from a first computing node to a second computing node. An example method may comprise detecting, by a processor, a first software build job executing on a first computing node; detecting a second software build job in a waiting state; determining that the first computing node is capable of executing the second software build job; responsive to determining that a second computing node is capable of executing the first software build job, migrating the first software build job to the second node; and executing the second software build job on the first node.

17 Claims, 6 Drawing Sheets

(56) References Cited

U.S. PATENT DOCUMENTS

| | | | | |
|---|---|---|---|---|
| 2009/0222654 | A1* | 9/2009 | Hum | G06F 9/5094 |
| | | | | 713/323 |
| 2014/0181830 | A1* | 6/2014 | Naik | G06F 9/5094 |
| | | | | 718/104 |
| 2015/0143364 | A1* | 5/2015 | Anderson | G06F 9/5016 |
| | | | | 718/1 |
| 2019/0097900 | A1 | 3/2019 | Rodriguez et al. | |
| 2019/0235922 | A1* | 8/2019 | Iovanna | G06F 9/4856 |
| 2020/0034277 | A1 | 1/2020 | Shveidel et al. | |
| 2020/0076689 | A1* | 3/2020 | Chandrashekar | G06F 9/45558 |
| 2020/0125344 | A1* | 4/2020 | Varghese | G06F 8/37 |
| 2020/0159627 | A1* | 5/2020 | Bedadala | G06F 16/113 |
| 2020/0183703 | A1* | 6/2020 | Kumar | G06F 9/45558 |

OTHER PUBLICATIONS

Nabavi et al "An Adaptive Plan-Oriented and Continuous Software Migration to Cloud in Dynamic Enterprises", Department of Computer Engineering and Information Technology, Shiraz University of Technology, Shiraz, Iran, Jun. 27, 2019, 14 pages https://onlinelibrary.wiley.com/doi/abs/10.1002/spe.2725.

Singh "Dynamic Pipelines in Azure Data Factory", Aug. 9, 2020, 6 pages https://medium.com/@amarpreet_singh/dynamic-pipelines-in-azure-data-factory-eaef611eda4b.

* cited by examiner

ACTIVE BUILD MIGRATION IN CONTINUOUS INTEGRATION ENVIRONMENTS

TECHNICAL FIELD

The present disclosure is generally related to build management, and more particularly, to active build migration in continuous integration environments.

BACKGROUND

In computer program development, continuous integration is the practice of merging developer working copies of computer program code for an application into a shared mainline code base, generally, several times a day. With continuous integration, each computer program developer team member submits source code for the application being developed on a daily (or more frequent) basis, and a set of operations referred to herein as a build process ("build") is performed to produce executable code from the source code. The executable code may be for an application, for example. The set of operations for providing a build may include compiling source code files to produce the executable code for an application, performing tests on the executable code, and instating or deploying the executable code. The build process may be performed at periodic times, or with each significant source code change. Isolated source code changes can be tested as part of the build process when the source code is added to the larger mainline code base.

BRIEF DESCRIPTION OF THE DRAWINGS

The present disclosure is illustrated by way of examples, and not by way of limitation, and may be more fully understood with references to the following detailed description when considered in connection with the figures, in which.

Figure 1:
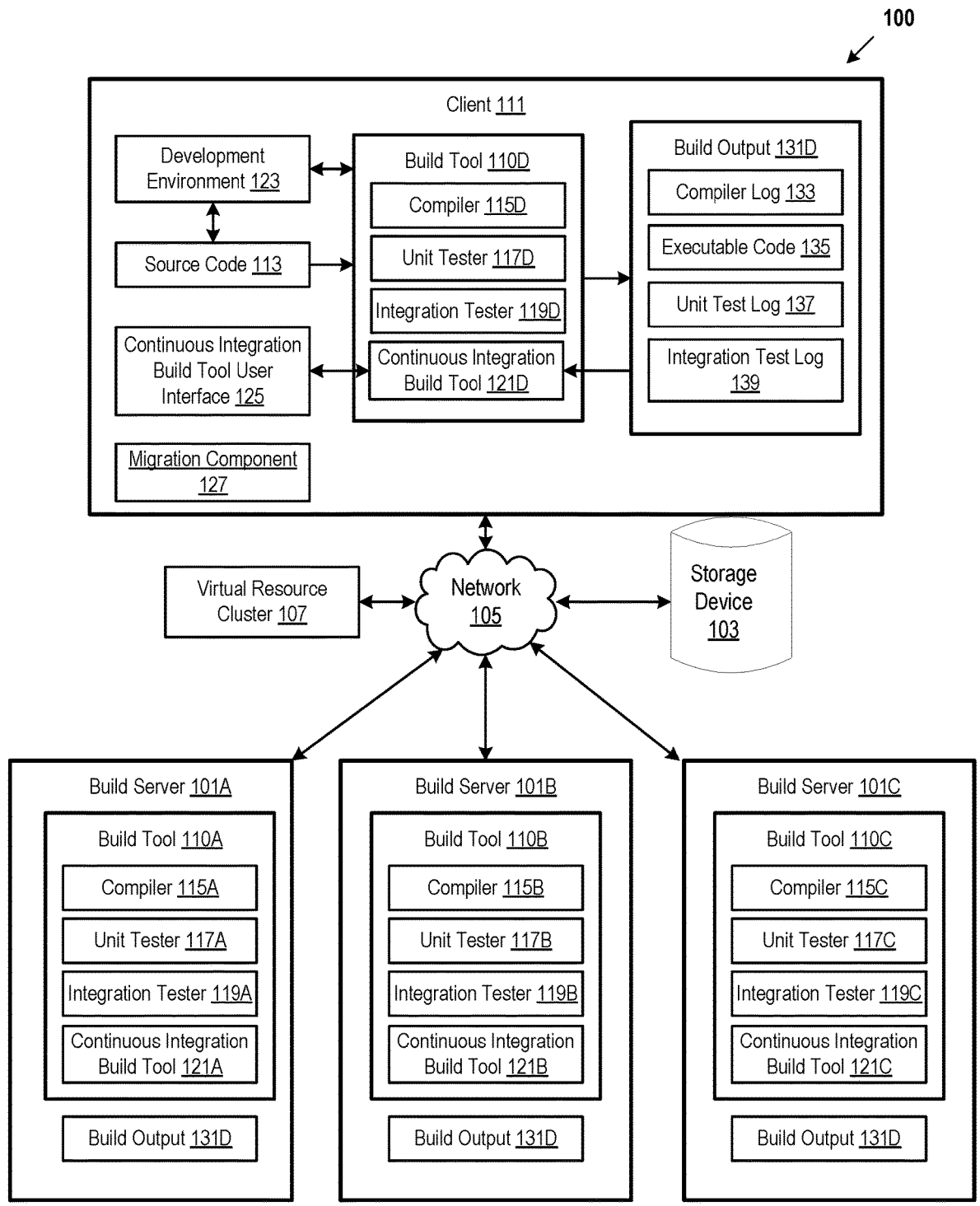
FIG. 1 depicts a high-level block diagram of an example computing environment that includes a continuous integration build tool user interface, in accordance with one or more aspects of the present disclosure.

Continuous software integration tools, referred to herein as "build tools," may perform build processes to generate software images from source code and other data. Software images may be, for example, executable code of software application programs. Source code may include instructions in a programming language that may be translated to executable code. The translation from source code to executable code may be performed by compiler programs. Other data may also be processed, e.g., transformed to suitable formats, and included in software images. A build process may cause the appropriate source code to be translated to executable code and included in the resulting software images. Instructions specifying how to perform the build process may be provided to the build tools in the form of build files, such as build scripts or declarative descriptions of the files to be built in terms of files from which they are built. A particular set of instructions specifying how to perform a particular build process are referred to herein as a software build "job." A job may be executed, e.g., by a build tool running on a computing node, and the executing job is referred to herein as an "active build." A computing node may be a virtualized or bare metal computer system (e.g., a server) that provides computing resources to execute jobs. A job may include a set of stages, which are may be executed sequentially in an active build. A job may thus be referred to as a "pipeline" of one or more stages. The stages may include, for example, compile, test, and deploy stages. The compile stage may translate source code to executable code, the test stage may perform tests to verify that the executable code operates correctly, and the deploy stage may install the executable code on host machines, for example. A build may execute for a substantial period of time (e.g., several minutes to several hours or days).

Computing nodes may be selected from a pool of available computing nodes and each computing node may include a different set of computing resources. Computing resources may include central processing unit(s) (CPU(s)), memory (e.g., volatile memory such as random access memory (RAM)), non-volatile memory, network bandwidth, etc. Scheduled jobs may be placed in a first-in, first-out (FIFO) build queue and the next available computing node from the node pool may be assigned to execute the next waiting job. In some instances, a computing node may be unable to execute a job. For example, the computing resources required to execute a job may be unavailable in the computing node. Accordingly, the job may remain in the build queue until a computing node capable of executing the job becomes available.

In some systems, once a computing node begins executing a job, the job may not be migrated to another computing node during execution. In an illustrative example, a node pool may include two computing nodes, a first node with relatively stronger computing resources, and a second node with relatively weaker computing resources. For example, the second computing node may have at least one computing resource that is inferior to a corresponding computing resource of the first computing node. A first job, capable of being executed on either computing node, may enter the build queue and be assigned, by a build tool, to execute on the next available computing node, which in this illustrative example is the relatively stronger computing node (e.g., the first computing node). A second job, which is capable of being executed only on the relatively stronger computing node, may then enter the build queue. However, existing build systems do not allow job migration and, since the relatively weaker computing node (e.g., the second computing node) is unable to execute the second job, the second job remains in a waiting state until the first job is completed by the relatively stronger computing node. This may lead to delays in job execution and a poor utilization of resources since the relatively weaker computing node is left idle while a job remains in the build queue. Accordingly, it is desirable to provide the ability to migrate an executing job to another computing node, thereby freeing up relatively stronger computing nodes for queued job requiring stronger computing resources.

Aspects of the present disclosure address the above-noted and other deficiencies by enhancing a build system with the ability to enable migration of a software build job executing on one computing node to another computing node. In an illustrative example, the build system may detect a first job executing on a first computing node. The build system may then detect a second job in a waiting state (e.g., in a build queue). The build system may then determine that the first computing node is capable of executing the second job, and that a second computing node is capable of executing the first job, but incapable of executing the second job. For example, one or more resources of the second computing node may be inferior to a comparable one or more resources of the first computing node. The build system may then migrate the first job to the second computing node and execute the second job on the first computing node.

In some embodiments, the build system may execute the pipeline of stages (e.g., the compile stage, the test stage, the deploy stage, etc.) on multiple computing nodes, thus completing the job at a faster rate. For example, using the illustrative example above, the build system may further determine that a third computing node is also capable of executing the second job. The build system may then execute a first stage of the pipeline of the second job on the first computing node, and a second stage of the pipeline of the second job on the third computing node.

Various aspects of the above referenced methods and systems are described in details herein below by way of examples, rather than by way of limitation. The examples provided below discuss a code review manager that integrates a development environment with a code review system. In other examples, the methods and systems described herein may be performed by any suitable component that interacts with the development environment and the code review system. In other examples, the code review manager may receive code review comments from any system that provides code review comments, and communicate the code review comments to any suitable system that includes a source code editor, and send status information, such as an indication that a source code file corresponding to the comment has been edited, or the review comment has otherwise been addressed, to the system that provides code review comments.

FIG. 1 depicts a high-level block diagram of an example computing environment 100 that includes a continuous integration build tool user interface 125, in accordance with one or more aspects of the present disclosure. The computing environment 100 may provide build management services that include executing build operations to perform builds of source code 113 to produce build output 131A-D. The builds may be performed in accordance with instructions provided by the continuous integration build tool user interface 125. The computing environment 100 may include build servers 101A-C for running the sets of operations for providing builds in a continuous integration environment. The builds may be for source code 113, e.g., of an application that is being developed. An application may be, for example, a web application, a desktop application, a browser application, etc. An application may be a messaging application, a video application, a social networking application, video sharing application, photo sharing application, chat application, mobile application of a content provider or any combination of such applications. An application may be a computationally large or data-intensive application, such as a forecasting application, a modeling application, a data analysis application, etc. The build servers 101A-C may be hosted on any type of computing node, which may be a virtualized or bare metal computing device such as a server computer, a desktop computer, a portable computing device such as, and not limited to, netbooks, laptop computers, and the like.

Build tools 110A-D may be located on client 111, on build servers 101A-C, or both. Each build tool 110A-D may execute a set of operations to provide the build of the mainline code. The mainline code may be the base of a project on which development progresses. The set of operations may include compiling the code, testing the code when the code is compiled, testing isolated code when the code is added to the larger mainline code base, and performing continuous build operations e.g., performing a build a periodic intervals or in response to user requests, and presenting information about the status of executing builds and the results of completed builds. A software build job (e.g., a pipeline of one or more stages) can be executed by build tool 110A-D. Client 111 may further include migration component 127 to enable the migration of a job executing on one build tool to another build tool. In some embodiments, the migrations may be user initiated. In other embodiments, the migrations may be automatically triggered by migration component 127. Migration component 127 will be explained in greater detail with references to FIG. 2 below.

Users, such as computer program development team members, may use a development environment 123 to submit source code 113 to the build tool 110D located on client 111 and/or to one or more build tools 110A-C located on build servers 101A-C. Users may submit source code to build tools 110A-C located on the build servers 101A-C from client 111 via network 105. Build tool 110A-D or other tool (e.g., a version control tool) may merge the submitted source code 113 with a shared mainline code base that is being stored and maintained by build server 101A-C. Users may submit source code 113 to any of the build tools 110A-D on a daily (or more frequent) basis, and request execution of a build process for the submission.

A client machine 111 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The network 105 may be a private network (e.g., a local area network (LAN), a wide area network (WAN), intranet, or other similar private networks) or a public network (e.g., the Internet).

Storage device 103 may be physical memory and may include volatile memory devices (e.g., random access memory (RAM)), non-volatile memory devices (e.g., flash memory, NVRAM), and/or other types of memory devices. In another example, storage device 103 may include one or more mass storage devices, such as hard drives, solid state drives (SSD)), other data storage devices, or a combination thereof. In yet another example, storage device 103 may be any virtual memory, logical memory, other portion of memory, or a combination thereof for storing, organizing, or accessing data. In a further example, storage device 103 may include a combination of one or more memory devices, one or more mass storage devices, virtual memory, other data storage devices, or a combination thereof, which may or may not be arranged in a cache hierarchy with multiple levels Build tool 110A-D may include a compiler 115A-D to compile computer source code 113 into executable code 135, and to generate other build output 131A-D, such as a compiler log 133 that contains output describing progress and results of the compilation process. Build tool 110A-D may include a unit tester 117A-D and an integration tester 119A-D for running automated tests on artifacts (e.g., tangible by-products produced during software development). Unit tester 117A-D may test that the individual functions in the source code 113 or executable code 135 work properly and generate unit test log 137 that contains output(s) describing progress and results of the unit tester 117A-D. Integration tester 119A-D may test the executable code 135 in an environment in which the executable code 135 is expected to be executed by users. Build tool 110A-D may include continuous integration build tool 121A-D for performing continuous build operations (e.g., performing a build at periodic intervals or in response to user requests), and presenting information about the status of executing builds and the results of completed builds. Continuous integration build tool 121A-D may start builds, e.g., by executing compiler 115A-D, unit tester 117A-D, and integration tester 119A-D in accordance with a build configuration script that contains instructions for compiling the source code and testing the resulting executable code 135. Continuous integration build tool 121A-D may monitor build output 131A-D and display progress information, such as the stage of the build (e.g., compiling, unit testing, or integration testing), the status of an executing build (e.g., how many files have been compiled, how many tests have passed, and how many tests have failed). Continuous integration build tool 121A-D may detect the completion of a build by receiving a result value from compiler 115A-D, unit tester 117A-D, and integration tester 119A-D, or by detecting particular text in the build output logs, for example. Continuous integration build tool 121A-D may generate an integration test log 139 containing information describing the progress of the operations performed by the continuous integration build tool 121A-D.

Integration tester 119A-D may create virtual resource cluster 107 for the integration testing of the artifacts. The virtual resources in cluster 107 may be containers, virtual machines, container(s) within a virtual machine, and/or virtual machine(s) running within a container. A container may refer to an isolated set of resources allocated to executing an application and/or process independent from other applications and/or processes. A virtual machine may be an emulated computer system, created using software, that includes its own operating system (referred to as a guest operating system) and executes application programs. A host machine may host one or more virtual resources for virtualizing one or more application servers for executing the artifacts for the application for the integration testing.

In one example, the host machine for virtual resource cluster 107 may be the same computing machine that hosts build server 101A-C and/or client 111. In another example, virtual resource cluster 107 may include one or more other computing machines not shown by FIG. 1. The computing machines may be server computer systems, desktop computers or any other computing devices.

A host machine may allocate a certain amount of its computing resources (e.g., processor resources (CPU resources), physical or virtual memory, input/output (I/O) resources, network resources, etc.) to individual virtual resources (e.g., virtual machine, container), and may multiplex the underlying hardware platform (e.g., infrastructure) of the host machine among the virtual resources on the host machine. For a virtual machine, the layer providing the virtualization is commonly referred to as a hypervisor and is also known as a virtual machine monitor (VMM), a kernel-based hypervisor, or part of a host operating system. The hypervisor may emulate the underlying hardware (e.g., infrastructure) of the host machine, making use of the virtual machine. Accordingly, each build tool 110A-D (or build server 101A-C and/or client 111) may be allotted a different set of computing resources. By way of illustrative example only, build tool 110A may be allotted two 2.4 megahertz (MHz) processors, and 2 gigabytes (GB) of RAM memory, build tool 110B may be allotted four 3.2 MHz processors and 16 GB of RAM memory, etc.

An application being deployed in the container may run under the host operating system. The host machine for the container may include a container engine to create and manage the containers. In one implementation, a container may run on a virtual machine to provide an extra layer of separation between applications running on a guest operating system of the virtual machine. In one implementation a virtual machine may run on a container to maintain isolation and security properties of virtual machines while being able to package and distribute computer programs as a container.

Integration tester 119A-D may run the executable code 135 in virtual resource cluster 107, and run integration tests against the distributed system being provided by virtual resource cluster 107. After build tool 110A-D compiles the source code 113 and runs unit tests and integration tests, build tool 110A-D may report whether the attempt to provide the build was a success or includes a failure. A failure may be caused by the compiling of the source code failing, unit testing failing, and/or integration testing failing.

Continuous integration build tool user interface 125 may enable a user to start one or more active build jobs. Continuous integration build tool user interface 125 presents an active build list, a build queue list, and a jobs list. The jobs list 212 includes one or more job representations, which are user-interface representations of jobs that build tool 110A-D can execute to perform builds. Instructions can be provided to build tools 110A-D in the form of build files, such as build scripts or declarative descriptions of the files to be built in terms of files from which they are built. A job can be executed by build tool 110A-D. A job can include a set of stages, which may be executed sequentially. The stages can include, for example, compile, test, and deploy stages. The compile stage may translate source code to executable code, the test stage may perform tests to verify that the executable code operates correctly, and the deploy stage may install the executable code on host machines or nodes.

Continuous integration build tool user interface 125 may further enable a user to migrate an active build (e.g., an executing job) from one build tool to another build tool. For example, continuous integration build tool user interface 125 may enable the user to migrate an active build from build tool 110A to build tool 110B. In some embodiments, continuous integration build tool user interface 125 may enable the user to migrate one or more stages of an active build from a first build tool to one or more other build tools. In one example, continuous integration build tool user interface 125 may enable the user to migrate the compile stage of an active build from build tool 110A to build tool 110B, the test stage of the active build from build tool 110A to build tool 110C, and the deploy stage of the active build from build tool 110A to build tool 110D. In another example, continuous integration build tool user interface 125 may enable the user to migrate the compile stage of an active build from build tool 110A to build tool 110B, the test stage of the active build from build tool 110A to build tool 110C, and maintain the deploy stage of the active build on build tool 110A. In yet another example, continuous integration build tool user interface 125 may enable the user to migrate the compile stage of an active build from build tool 110A to build tool 110B, and both the test stage and the deploy stage of the active build from build tool 110A to build tool 110C.

In some embodiments, continuous integration build tool user interface 125 may enable the user to initiate the stages of a pipeline on different build tools 110A-D. In particular, continuous integration build tool user interface 125 may enable the user to initiate the execution of a job by executing a first state of its pipeline on a first build tool, a second stage of its pipeline of a second build tool, etc. For example, continuous integration build tool user interface 125 may enable the user to initiate the compile stage of a pipeline on build tool 110A, initiate the test stage of the pipeline on build tool 110B, etc.

Figure 2:
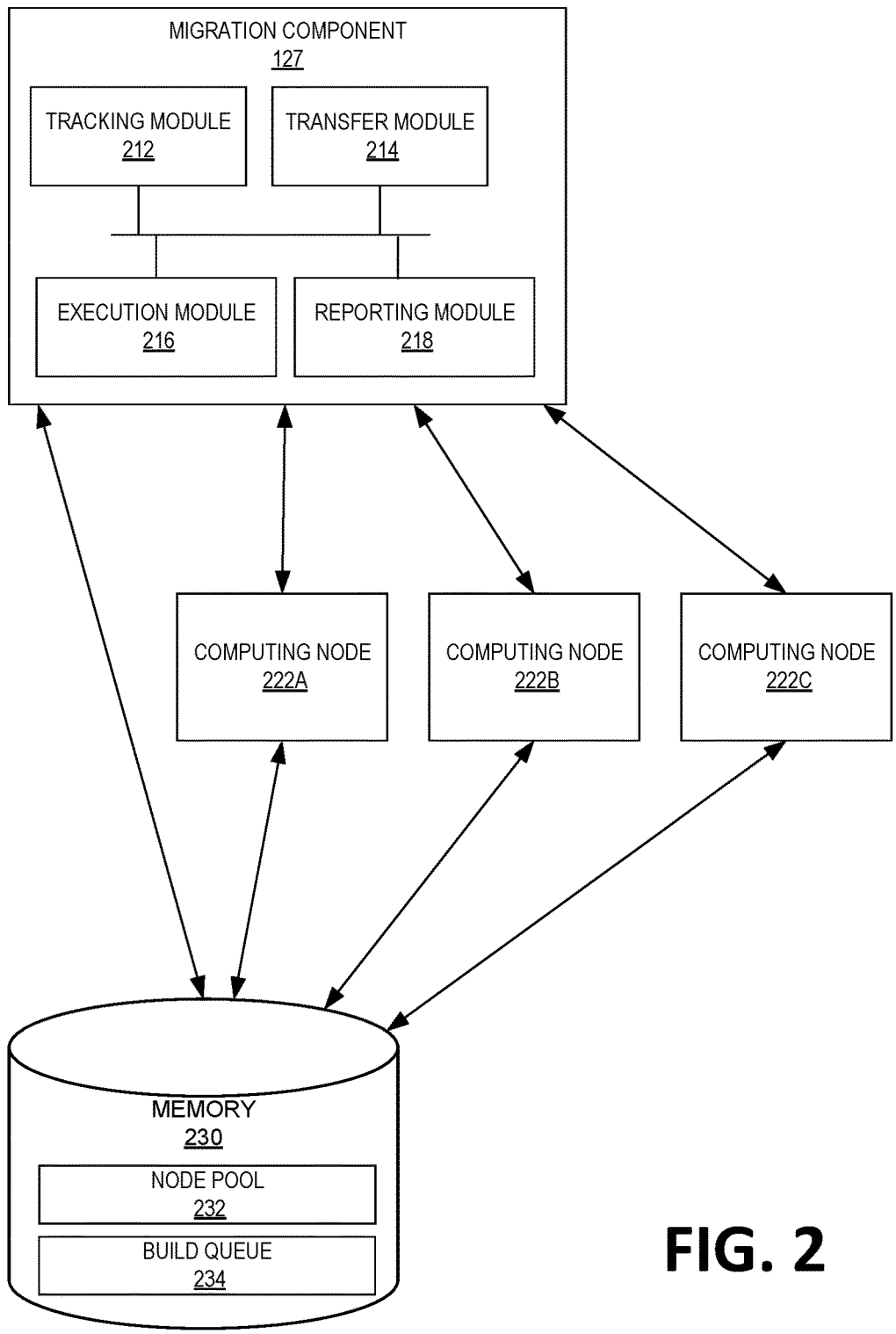
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. In the example shown, computer system 200 may include migration component 127, computing nodes 222A-222C, and memory 230. Migration component 127 may run executable code that implements one or more of the components and modules and may be implemented within a host operating system, a hypervisor, a guest operating system, a container, hardware firmware, or a combination thereof. Migration component 127 may include tracking module 212, transfer module 214, execution module 216, and reporting module 218. Computing node 222A-C may be a virtualized or bare metal computing device such as a server computer, a desktop computer, a portable computing device, etc. Memory 230 may include node pool 232 and build queue 234.

Tracking module 212 may track which computing nodes 222A-C are executing active builds and display the active builds in an active build list. In one example, tracking module 212 may maintain a node state metadata table indicating which computing nodes 222A-C are in an active state (e.g., executing an active build) and which computing nodes 222A-C are in a waiting state (e.g., not executing an active build). In another example, tracking module 212 may determine whether a computing node is active based on the computing node's inclusion in the node pool (e.g., if a computing node is not in the node pool, then that computing node may be determined to be active). In some embodiments, tracking module 212 may communicate with each computing node 222A-C to periodically update the node pool. In one example, tracking module 212 may communicate with each computing node 222A-C via a program capable of handling periodic requests (such as a daemon) to determine the state (e.g., active state, waiting state, etc.), of each computing node 222A-C. In another example, tracking module 212 may read one or more logs generated by each computing node 222A-C, where each log may indicate whether the respective computing node 222A-C is in an active state, a waiting state, etc. In yet another example, tracking module 212 may listen to network traffic generated by each computing node 222A-C to determine the state of each computing node 222A-C. For example, tracking module 212 can capture data packets transmitted or received by each computing node 222A-C using, for example, a packet sniffer, a filter, etc.

Tracking module 212 may further update a resource metadata table and track, using the resource metadata table, the computing resources (e.g., (CPU resources memory resources, (I/O) resources, network resources, etc.) allotted to each computing node 222A-222C. For example, computing node 222A may be allotted two 2.4 megahertz (MHz) processors, and 2 gigabytes (GB) of RAM memory, computing node 222B may be allotted four 3.2 MHz processors and 16 GB of RAM memory, etc. Tracking module 212 may update the resource metadata table using, for example, a program capable of handling periodic requests (e.g., a daemon), logs generated by each computing node 222A-C, network traffic generated by each computing node 222A-C, etc.

Tracking module 212 may further track jobs, using the node state metadata table, in a waiting state awaiting a computing node. Tracking module 212 may store jobs in a waiting state in build queue 234. In some embodiments, jobs in build queue 234 are stored in a first-in, first-out order. Jobs in build queue 234 can be removed, by tracking module 212, from the build queue 234 when active builds of the jobs begin. The active builds can then be added to an active build list. In some embodiments, tracking module 212 may display available computing nodes, busy computing nodes (e.g., computing nodes executing active builds), computing resources of each computing node, and queued jobs on a GUI (e.g., continuous integration build tool user interface 125).

Each job may be associated with one or more resources tags indicating the type of computing resources that are necessary to execute the job. For example, each resource tag may indicate a minimum processing power required, a minimum memory required, and any additional computing requirements (e.g., network capabilities, I/O components, etc.)

In some embodiments, tracking module 212 may determine that an active build may be migrated to a weaker computing node (e.g., a computing node with at least one resource that has a performance characteristic less than a comparable resource of another computing node). For example, tracking module 212 may detect an active build executing on computing node 222B by sending a status request to the computing node 222B, reading one or more logs generated by computing node 222B, listening to network traffic generated by computing node 222B, reading the node state metadata table, etc. Tracking module 212 may then scan node pool 232 or the node state metadata table for available computing nodes, determine that a computing node (e.g., computing node 222A) is free and has at least one computing resource that it has a performance characteristic less than a comparable resource of computing node 222B, and that the computing resources of computing node 222A are capable of executing the active build by using, for example, any combination of the resources tags included with the jobs, the node state metadata table, the resource metadata table, the build list, etc.

In some embodiments, in response to detecting a job in a waiting state in the build queue 234, tracking module 212 may determine whether the active build may be migrated to another computing node. In some embodiments, tracking module 212 may determine that the active build may be migrated in response to detecting a job in a waiting state in the build queue 234 and further determining that the job cannot be executed on one or more available computing nodes by comparing the resource requirements required for executing the job to the resources provided by the one or more available computing nodes. In some embodiments, tracking module 212 may determine whether the active build may be migrated to another computing node by comparing the resource requirements required for executing the active build to the resources provided by the another computing node. In some embodiments, in response to detecting the active build executing on the computing node, tracking module 212 may determine whether the active build may be migrated to another computing node. In some embodiments, tracking module 212 may perform periodic scans to determine whether an active build may be migrated to a weaker computing node. In response to detecting that the active build may be migrated, tracking module 212 may send a migration request to transfer module 214.

Transfer module 214 may execute a migration of an active build from one computing node (e.g., an initial computing node) to another computing node (e.g., a new computing node). Responsive to detecting a migration request from tracking module 212, transfer module 214 may suspend execution of the active build to be migrated. For example, transfer module 214 may suspend execution of the active build on computing node 222B. Transfer module 214 may then store any progress (e.g., compiled code, data logs, etc.) already completed by the initial computing node (e.g., computing node 222B) on memory 230. Transfer module 214 may then migrate the active build to the new computing module (e.g., computing node 222A). The migration may include the progress from the job already completed by the initial computing node, the remaining portion of the job to be executed, and an indication of where to resume the job, etc. Execution module 216 may then resume execution of the active build on the new computing node. In response to completion of the migration, transfer module 214 may send an indication to tracking module 212 that the initial computing node is free.

Execution module 216 may further initiate execution of a new job in a waiting state in build queue 234 on the freed node (e.g., the initial computing node). In some embodiments, execution module 216 may receive an indication from a client (e.g., client 111) of which job to execute. In some embodiments, execution module 216 may select the next available job from job queue 234.

In some embodiments, transfer module 214 may migrate different stages (e.g., the compile stage, the test stage, the deploy stage, etc.) of the active build to different computing nodes. For example, transfer module 214 may receive an instruction to migrate the compile stage of the active build from computing node 222B to computing node 222A, and the test and deploy stages from computing node 222B to computing node 222C. The instruction may be user initiated or initiated automatically by tracking module 212. In one example, the user may tag which stages are to be migrated to which computing nodes (or which stages are to remain on the computing node executing the active build). In another example, tracking module may indicate which stage(s) is to be migrated (or remain) based on computing resources of each computing node, required computing time of the stages on each computing node, etc. For example, each resources tag may include sub-tags to indicate the resource required by each of the stages. Tracking module 212 may compare the resources required by each sub-tag to the resources of each computing node 222A-C to determine to which computing node 222A-C each stage can be migrated to. The sub-tags may be automatically generated a build tool based on the resource requirements of each stage, or provided by a user.

Reporting module 218 may generate a pipeline log describing the progress of the operations performed by the computing nodes 222A-C. For example, the pipeline log may include data from the compiler log, the build output log, the unit test log, the integration test log, task failures, diagnostics data, etc. In some embodiments, reporting module 218 can generate a pipeline log for each job executed on computing node 222A-C. In embodiments where multiple computing nodes 222A-C execute different stages of the same job, reporting module 218 may aggregate the pipeline log from each of the computing nodes 222A-C into a single pipeline log. For example, execution module 216 may execute the compile stage of the active build on computing node 222A, and the test stage of the active build on computing node 222B, and the deploy stage on computing node 222C. Reporting module 218 may first generate a pipeline log for each of the stages executed on the respective computing nodes 222A-C. Reporting module 218 may then aggregate each of the pipeline logs into a single pipeline log for display to the user. For example, reporting module 218 may combine the data from each of the pipeline logs into the single pipeline log.

Figure 3:
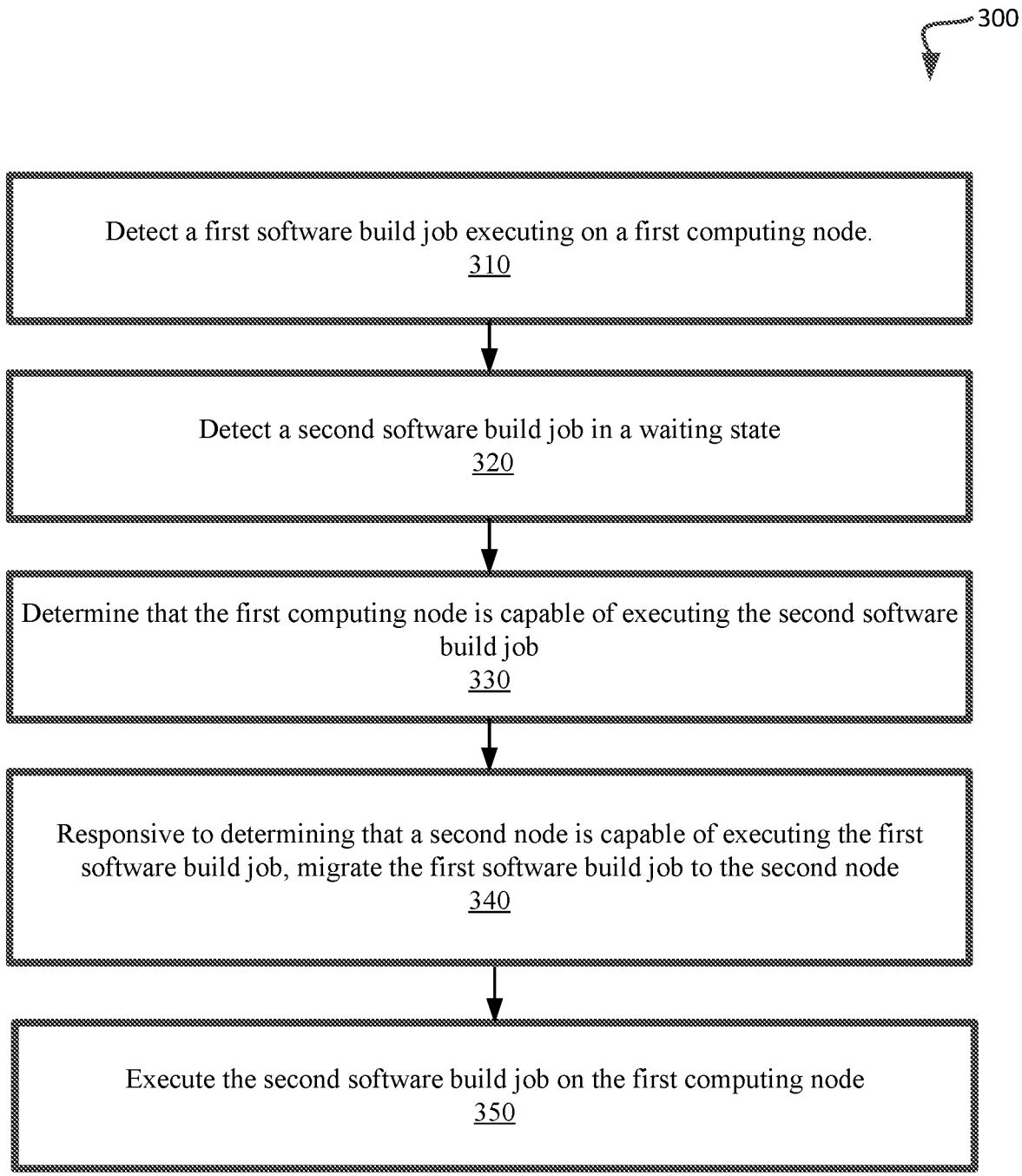
FIG. 3 depicts a flow diagram of an example method for migrating an active build, in accordance with one or more aspects of the present disclosure.

FIG. 3 depicts a flow diagram of an example method 300 for migrating an active build, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by an executable code of a host machine (e.g., host operating system or firmware), a virtual machine (e.g., guest operating system or virtual firmware), an external device (e.g., a PCI device), other executable code, or a combination thereof.

Method 300 may be performed by processing devices of a server device or a client device and may begin at block 310. At block 310, a host computer system may detect a first software build job executing on a first computing node. The first computing node may have a first set of computing resources.

At block 320, the host computer system may detect a second software build job in a waiting state. For example, the second software build job may be stored in a build queue. At block 330, the host computer system may determine that the first computing node is capable of executing the second software build job.

At block 340, responsive to determining that a second computing node is capable of executing the first software build job, the host computer system may migrate the first software build job to the second computing node. For example, the host computer system may suspend execution of the first software build job, store progress completed by the first computing node, and transfer the stored process and an indication of where to resume execution of the first software build job to the second computing node. In one embodiment, the second computing node may have a second set of resources which includes at least one resource that is inferior to (has a performance characteristic less than) a comparable resource of a first set of resources. In some embodiments, the host computer system may perform periodic scans to determine whether an executing software build job may be migrated to a weaker computing node.

At block 350, the host computer system may execute the second software build job on the first computing node. Responsive to migrating the first software build job to the second computing node, the host computer system may send an indication that the first computing node is free.

In some embodiments, the host computer system may detect a third computing node capable of executing at least one stage of the software build job. The host computer system may then execute a first stage of the second software build job on the first computing node and execute a second stage of the second software build job on the third computing node. In some embodiments, the host computer system may generate a first data log for the first stage of the second software build job that was executed on the first computing node and generate a second data log for the second stage of the second software build job executed on the second computing node. The host computer system may then aggregate the first data log and the second data log into a third data log. Responsive to completing the operations described herein above with references to block 350, the method may terminate.

Figure 4:
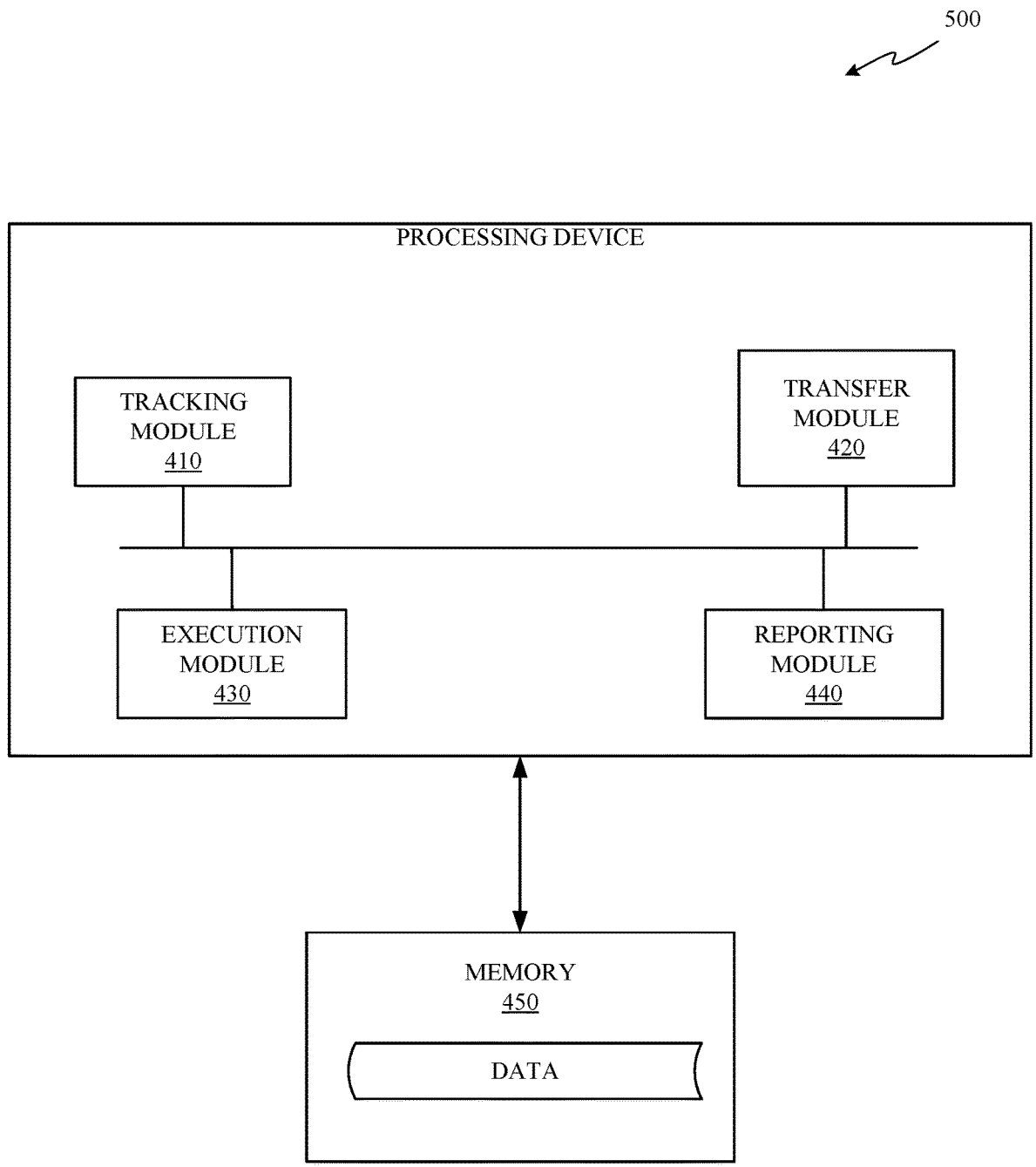
FIG. 4 depicts a block diagram of a computer system operating in accordance with one or more aspects of the present disclosure.

FIG. 4 depicts a block diagram of a computer system 400 operating in accordance with one or more aspects of the present disclosure. One or more of the components of FIG. 1 may execute on computer system 400. Computer system 400 may be the same or similar to client 111 or build server 101A-D of FIG. 1, and may include one or more processors and one or more memory devices. In the example shown, computer system 400 may include tracking module 410, transfer module 420, execution module 430, reporting module 440, memory 450.

Tracking module 410 may detect a first software build job executing on a first computing node. The first computing node may have a first set of computing resources. Tracking module 410 may further detect a second software build job in a waiting state. For example, the second software build job may be stored in a build queue in memory 450. Tracking module 410 may then determine that the first computing node is capable of executing the second software build job.

Responsive to tracking module 410 determining that a second computing node is capable of executing the first software build job, transfer module 420 may migrate the first software build job to the second computing node. For example, transfer module 420 may suspend execution of the first software build job, store progress completed by the first computing node, and transfer the stored process and an indication of where to resume execution of the first software build job to the second computing node. In one embodiment, the second computing node may have a second set of resources which includes at least one resource that is inferior to (has a performance characteristic less than) a comparable resource of a first set of resources. In some embodiments, tracking module 410 may perform periodic scans to determine whether an executing software build job may be migrated to a weaker computing node.

Execution module 430 may execute the second software build job on the first computing node. Responsive to migrating the first software build job to the second computing node, transfer module 420 may send an indication to tracking module 410 that the first computing node is free.

In some embodiments, tracking module 410 may detect a third computing node capable of executing at least one stage of the software build job. The execution module 430 may then execute a first stage of the second software build job on the first computing node and execute a second stage of the second software build job on the third computing node. In some embodiments, reporting module 440 may generate a first data log for the first stage of the second software build job that was executed on the first computing node and generate a second data log for the second stage of the second software build job executed on the second computing node. The reporting module 440 may then aggregate the first data log and the second data log into a third data log.

Figure 5:
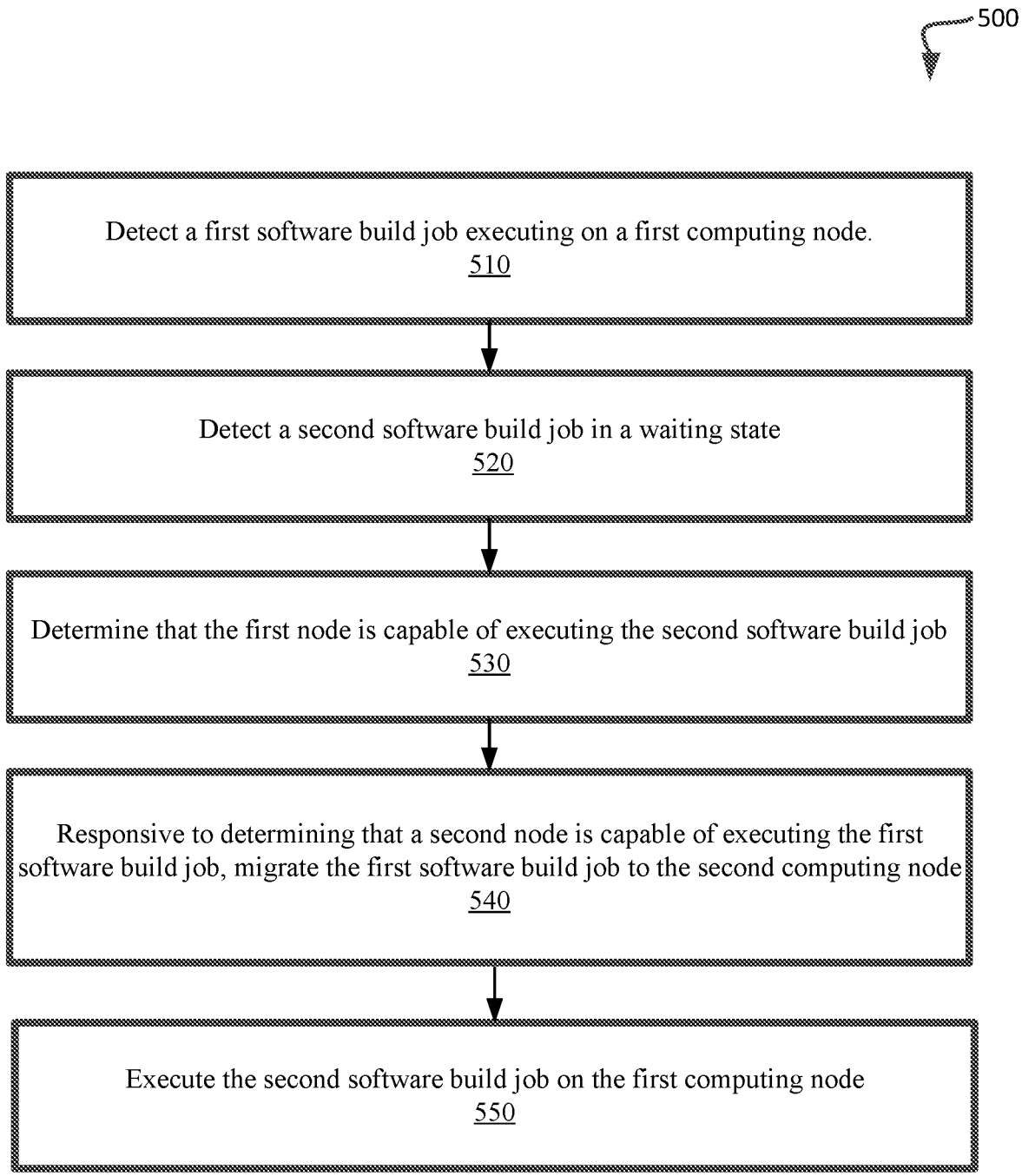
FIG. 5 depicts a flow diagram of another example method for migrating an active build, in accordance with one or more aspects of the present disclosure.

FIG. 5 depicts a flow diagram of one illustrative example of a method 500 for migrating an active build, in accordance with one or more aspects of the present disclosure. Method 500 may be similar to method 500 and may be performed in the same or a similar manner as described above in regards to method 500. Method 500 may be performed by processing devices of a server device or a client device and may begin at block 502.

At block 510, a processing device may detect a first software build job executing on a first computing node. The first computing node may have a first set of computing resources.

At block 520, the processing device may detect a second software build job in a waiting state. For example, the second software build job may be stored in a build queue. At block 530, the processing device may determine that the first computing node is capable of executing the second software build job.

At block 540, responsive to determining that a second computing node is capable of executing the first software build job, the processing device may migrate the first software build job to the second computing node. For example, the processing device may suspend execution of the first software build job, store progress completed by the first computing node, and transfer the stored process and an indication of where to resume execution of the first software build job to the second computing node. In one embodiment, the second computing node may have a second set of resources which includes at least one resource that is inferior to (has a performance characteristic less than) a comparable resource of a first set of resources. In some embodiments, the processing device may perform periodic scans to determine whether an executing software build job may be migrated to a weaker computing node.

At block 550, the processing device may execute the second software build job on the first computing node. Responsive to migrating the first software build job to the second computing node, the processing device may send an indication that the first computing node is free.

In some embodiments, the processing device may detect a third computing node capable of executing at least one stage of the software build job. The processing device may then execute a first stage of the second software build job on the first computing node and execute a second stage of the second software build job on the third computing node. In some embodiments, the processing device may generate a first data log for the first stage of the second software build job that was executed on the first computing node and generate a second data log for the second stage of the second software build job executed on the second computing node. The processing device may then aggregate the first data log and the second data log into a third data log. Responsive to completing the operations described herein above with references to block 550, the method may terminate.

Figure 6:
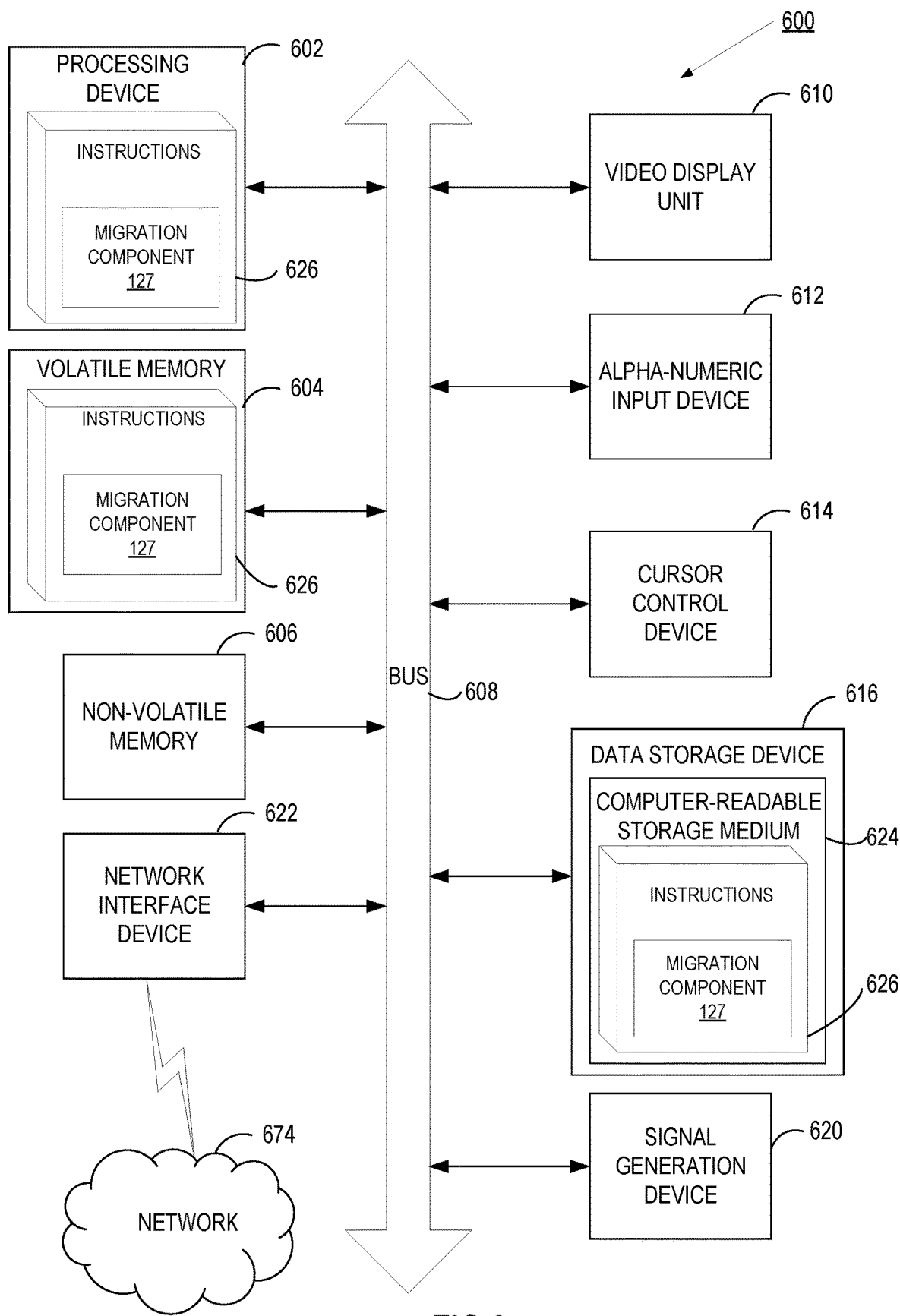
FIG. 6 depicts a block diagram of an example computer system operating in accordance with one or more aspects of the present disclosure.

FIG. 6 depicts a block diagram of a computer system operating in accordance with one or more aspects of the present disclosure. In various illustrative examples, computer system 600 may correspond to computing environment 100 of FIG. 1. Computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 and 500.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
detecting, by a processor, a first software build job executing on a first computing node;
detecting a second software build job in a waiting state;
determining that the first computing node is capable of executing the second software build job;
responsive to determining that a second computing node is capable of executing the first software build job and that the second computing node is incapable of executing the second software build job due to at least one computing resource of the second computing node having a first value of a chosen performance characteristic less than a second value of the chosen performance characteristic of a corresponding computing resource of the first computing node, migrating the first software build job to the second computing node by:
suspending execution of the first software build job; and
transferring, to the second computing node, compiled code and data logs associated with an executed portion of the first software build job and an indication of where to resume execution of the first software build job on the second computing node;
initiating execution of the first software build job on the second computing node; and
initiating execution of the second software build job on the first computing node.

2. The method of claim 1, further comprising:
detecting a third computing node that is capable of executing at least a part of the second software build job;
executing a first stage of the second software build job on the first computing node; and
executing a second stage of the second software build job on the third computing node.

3. The method of claim 2, further comprising:
generating a first data log associated with the first stage of the second software build job executed by the first computing node;
generating a second data log associated with the second stage of the second software build job from the second computing node; and
aggregating the first data log and the second data log into a third data log.

4. The method of claim 1, wherein a first set of resources associated with the second computing node comprises at least one resource that has a performance characteristic less than a comparable resource of a second set of resources associated with the first computing node.

5. The method of claim 1, further comprising:
responsive to migrating the first software build job to the second computing node, sending an indication to a client device that the first computing node is free.

6. The method of claim 1, further comprising:
performing periodic scans to determine whether an executing software build job executing on an initial computing node may be migrated to another computing node that has a performance characteristic less than a comparable resource of the initial computing node.

7. A system comprising:
a memory;
a processing device operatively coupled to the memory, the processing device configured to:
detect a first software build job executing on a first computing node;
detect a second software build job in a waiting state;
determine that the first computing node is capable of executing the second software build job;
responsive to determining that a second node is capable of executing the first software build job and that the second node is incapable of executing the second software build job due to at least one computing resource of the second computing node having a first value of a chosen performance characteristic less than a second value of the chosen performance characteristic of a corresponding computing resource of the first computing node, migrate the first software build job to the second computing node by:
suspending execution of the first software build job; and
transferring, to the second computing node, compiled code and data logs associated with an executed portion of the first software build job and an indication of where to resume execution of the first software build job on the second computing node;
initiating execution of the first software build job on the second computing node; and
initiating execution of the second software build job on the first computing node.

8. The system of claim 7, wherein the processing device is further configured to:
detect a third computing node that is capable of executing at least a part of the second software build job;
execute a first stage of the second software build job on the first computing node; and
execute a second stage of the second software build job on the third computing node.

9. The system of claim 8, wherein the processing device is further configured to:
generate a first data log associated with the first stage of the second software build job executed by the first computing node;
generate a second data log associated with the second stage of the second software build job from the second computing node; and
aggregate the first data log and the second data log into a third data log.

10. The system of claim 7, wherein a first set of resources associated with the second computing node comprises at least one resource that has a performance characteristic less than a comparable resource of a second set of resources associated with the first computing node.

11. The system of claim 7, wherein the processing device is further configured to:
responsive to migrating the first software build job to the second computing node, send an indication to a client device that the first computing node is free.

12. The system of claim 7, wherein the processing device is further configured to:
perform periodic scans to determine whether an executing software build job executing on an initial computing node may be migrated to another computing node that has a performance characteristic less than a comparable resource of the initial computing node.

13. A non-transitory machine-readable storage medium storing executable instructions that, when executed by a processing device, cause the processing device to:
- detect a first software build job executing on a first computing node;
- detect a second software build job in a waiting state;
- determine that the first computing node is capable of executing the second software build job;
- responsive to determining that a second computing node is capable of executing the first software build job and that the second computing node is incapable of executing the second software build job due to at least one computing resource of the second computing node having a first value of a chosen performance characteristic less than a second value of the chosen performance characteristic of a corresponding computing resource of the first computing node, migrate the first software build job to the second computing node by:
  - suspending execution of the first software build job; and
  - transferring, to the second computing node, compiled code and data logs associated with an executed portion of the first software build job and an indication of where to resume execution of the first software build job on the second computing node;
- initiating execution of the first software build job on the second computing node; and
- initiating execution of the second software build job on the first computing node.

14. The non-transitory machine-readable storage medium of claim 13, further comprising executable instructions that, when executed by the processing device, cause the processing device to:
- detect a third computing node that is capable of executing at least a part of the second software build job;
- execute a first stage of the second software build job on the first computing node; and
- execute a second stage of the second software build job on the third computing node.

15. The non-transitory machine-readable storage medium of claim 14, further comprising executable instructions that, when executed by the processing device, cause the processing device to:
- generate a first data log associated with the first stage of the second software build job executed by the first computing node;
- generate a second data log associated with the second stage of the second software build job from the second computing node; and
- aggregate the first data log and the second data log into a third data log.

16. The non-transitory machine-readable storage medium of claim 13, further comprising executable instructions that, when executed by the processing device, cause the processing device to:
- responsive to migrating the first software build job to the second computing node, send an indication to a client device that the first computing node is free.

17. The non-transitory machine-readable storage medium of claim 13, further comprising executable instructions that, when executed by the processing device, cause the processing device to:
- perform periodic scans to determine whether an executing software build job executing on an initial computing node may be migrated to another computing node that has a performance characteristic less than a comparable resource of the initial computing node.

* * * * *